United States Patent
Svehaug (10) Patent No.: US 6,367,501 B2
(45) Date of Patent: Apr. 9, 2002

(54) ANTI-GEYSER SHUT-OFF VALVE ASSEMBLY

(76) Inventor: Oswald Svehaug, 25 Shirley St., Chula Vista, CA (US) 91910

(*) Notice: Subject to any disclaimer, the term of this patent is extended or adjusted under 35 U.S.C. 154(b) by 0 days.

(21) Appl. No.: 09/813,901

(22) Filed: Mar. 22, 2001

Related U.S. Application Data (60) Provisional application No. 60/199,241, filed on Apr. 24, 2000.

(51) Int. Cl.[7] ............................................. F16K 17/30
(52) U.S. Cl. .................... 137/517; 137/513; 137/541; 239/533.15; 239/571
(58) Field of Search ................................ 137/517, 513, 137/541; 239/533.15, 571, 572

(56) References Cited

U.S. PATENT DOCUMENTS

| | | | | |
|---|---|---|---|---|
| 3,794,077 A | * | 2/1974 | Fanshier | 137/517 X |
| 4,842,198 A | * | 6/1989 | Chang | 239/533.15 X |
| 5,465,752 A | * | 11/1995 | Higgins | 137/541 X |
| 5,613,518 A | * | 3/1997 | Rakieski | 137/517 X |
| 6,123,100 A | * | 9/2000 | Ward | 137/517 X |
| 6,308,730 B1 | * | 10/2001 | Schulze | 137/517 X |

* cited by examiner

Primary Examiner—Kevin Lee
(74) Attorney, Agent, or Firm—Charles C. Logan, II (57) ABSTRACT

An anti-geyser shut-off valve assembly for a water sprinkler irrigation system. It has a valve housing, a valve member, a coil spring, and a push nut that would be installed on the elongated shaft member of the valve housing for restricting the distance that the valve member may be biased away from a valve housing. When a sprinkler housing is mounted above the shut-off valve assembly and is operating properly, there is minimal obstruction to the water flow passing therethrough. If the sprinkler head or riser is broken off, the uncontrolled geyser of water will be automatically shut off and a thin stream of water would be sprayed upwardly to function as a flag identifying that the sprinkler head requires repair.

19 Claims, 7 Drawing Sheets

ANTI-GEYSER SHUT-OFF VALVE ASSEMBLY

This application claims benefit to U.S. provisional application Ser. No. 60/199,241, filed Apr. 24, 2000.

BACKGROUND OF THE INVENTION

The invention relates to a valve assembly and more specifically to an anti-geyser shut-off valve assembly for a water sprinkler irrigation system. Water sprinklers are used in numerous applications for irrigating a grass or vegetation covered landscape and for agriculture use.

Vivid pictures exist in everyone's mind of situations where a water sprinkler has been broken off the top of a water pipe and has resulted in a geyser of water rising skyward wasting precious water until the break is discovered. This situation occurs in residential lawns, on golf courses, in agricultural fields and other locations. In some instances the person who has turned on the water sprinkler can quickly shut off the water supply and minimize the amount of water loss. However, quite often the water sprinklers that break are in locations where they are sporadically monitored and they can go for a period of time without noticing that the water sprinkler is broken. In these instances, large pools of water may form and soil erosion may occur. The need to conserve water in all instances requires that this problem be solved.

Presently there is an anti-geyser shut-off valve assembly for a water sprinkler irrigation system that attempts to solve this problem. It's inefficient design notably decreases the amount of water that can be delivered to the water sprinkler. This prior art valve assembly also has an objectionable amount of intrusion into the water flowing through the main line of the irrigation system. This amount of restriction to water flow multiplies each time an additional water sprinkler is added to the irrigation system. The prior art shut-off valve assembly produces an inadequate thin stream of water spray upwardly from the shut-off valve assembly which does not give adequate attention to the occurance of damage to that particular sprinkler head. The existing shut-off valve assemblies require trimming the length of one of its components so that it will properly function with different lengths of riser tube. Also it is necessary to turn off the water of the irrigation system when the riser or the sprinkler head needs to be changed or replaced. The amount of time required to install the existing valve assemblies is excessive due to the structure of the existing shut-off valve assemblies.

It is an object of the invention to provide a novel anti-geyser shut-off valve assembly that is capable of delivering a greater amount of water to the sprinkler head and therefore provide more area of coverage.

It is also an object of the invention to provide a novel anti-geyser shut-off valve assembly whose design provides a much smaller intrusion into the water flow through the main line of the irrigation system.

It is another object of the invention to provide a novel anti-geyser shut-off valve assembly that produces a vertically oriented fine stream of water that rises to a quickly recognizable visible height to indicate that a particular water sprinkler is broken and requires immediate maintenance.

It is an additional object of the invention to provide a novel anti-geyser shut-off valve assembly that can be installed in a fraction of the time required for present day shut-off valve assemblies.

It is a further object of the invention to provide a novel anti-geyser shut-off valve assembly that will function without a riser or with any length of riser.

It is also an object of the invention to provide a novel anti-geyser shut-off valve assembly that can be reset by manually blocking the orifice on the sprinkler head, allowing the shut-off valve assembly to equalize the pressure, when the riser or the sprinkler head needs changed or replaced.

It is another object of the invention to provide a novel anti-geyser shut-off valve assembly that is more easily installed to thereby reduce the cost of labor required for installation or maintenance.

It is also an object of the invention to provide a novel anti-geyser shut-off valve assembly that is more economical to manufacture and market.

SUMMARY OF THE INVENTION

The anti-geyser shut-off valve assembly has been designed so that it can be installed into the upwardly extending tubular sleeve of a T-shaped pipe coupling member. Most of these coupling members would be made of PVC material and the upwardly extending tubular sleeve would be internally threaded. Modifications to the basic anti-geyser shut-off valve assembly provides an alternative embodiment. This alternative embodiment is capable of being used with a metal T-shaped pipe coupling member whose upwardly extending tubular sleeve has straight threads as opposed to the PVC T-shaped pipe coupling member that has tapered threads. The alternative embodiment can also be installed in a PVC T-shaped coupling member whose upwardly extending tubular sleeve is not internally threaded but instead receives the bottom end of an unthreaded riser and the two parts would be cemented together.

The basic anti-geyser shut-off valve assembly has four individual components and they are as follows: a valve housing, a valve member, an inverted conically configured coil spring and a push nut.

The valve housing has a tubular body portion having an outwardly extending annular flange that is threaded on its outer edge. It also has a centrally located vertically oriented shaft member and a bore hole that extends from its bottom end to its top end. The shaft member has a head portion and three rib members connect the head portion with the inside wall surface of the tubular body portion. The rib members provide a minimum amount of obstruction to the upward flow of the water through the valve housing on the way to its water sprinkler.

The valve member has a disc portion whose diameter is at least as great as the diameter of the tubular body portion of the valve housing and therefore provide an adequate sealing surface. Three upwardly extending brace members are connected at their inner edges to a tubular sleeve and this entire structure is connected to the top surface of the disc portion. The disc portion has a bore hole that aligns with the bore hole of the tubular sleeve. The brace members when installed in the valve housing would substantially align with the rib members of the valve housing to again minimize the amount of restriction to the water flowing therethrough. The shaft member of the valve housing will telescope in and out of the tubular sleeve of the disc portion during its operation. The top edge of the respective brace members are notched adjacent their inner ends to provide a seat for the smaller coil of a metal coil spring having the configuration of an inverted cone. The larger coil at its top end would be captured against the bottom surface of the respective rib members. A push nut installed on the bottom end of the shaft member of the valve housing restricts the distance that the valve member may be biased away from the valve housing. This controls the amount of water that can normally flow from the main line of the irrigation pipe and upwardly through the anti-geyser shut-off valve assembly to its sprinkler.

The top surface of the valve housing has a plurality of arcuate extraction tool sockets that removably receives mating fingers on the bottom end of an installation and extraction tool. Using the installation and extraction tool, the assembled anti-geyser shut-off valve assembly is inserted into the top end of the upwardly extending internally threaded sleeve of the T-shaped pipe coupling member. After it has been properly tightened in place, the tool is removed and a riser tube of a proper length is threadably screwed into the upwardly extending internally threaded sleeve of the T-snapped pipe coupling member.

The manner in which the anti-geyser shut-off valve assembly functions will now be described.

The coil spring provides a downward biased force against the valve member to provide an adequate opening for water to enter from the main water line and travel upwardly through the valve housing along the riser to the water sprinkler unit. An example for discussion purposes might have the flow from the water sprinkler unit in the range from 4 to 5 gallons per minute. This is the amount of water flow traveling up through the riser and exiting the water sprinkler head. When the water sprinkler unit is removed or the riser is broken off, the flow of water increases to approximately 6 gallons per minute causing the valve member to rise upwardly along the elongated shaft member of the valve housing until it seals off the bottom end of the tubular body portion and stops the flow of water upwardly through the anti-geyser shut-off valve assembly. Concurrently, water from the main pipe will be forced upwardly through the narrow bore hole of the tubular body portion of the valve housing and produce a pressurized stream that travels approximately 8 to 18 feet in the air and functions as a flag to assist in locating problem sprinklers. While the valve member is sealed against the bottom of the tubular body portion of the valve housing, the broken riser and/or sprinkler may be removed and replaced without the necessity of turning off the flow of water through the main line.

When a metal T-shaped coupling member with an internally threaded top tubular sleeve is used for connecting a water sprinkler unit, an alternative embodiment of the anti-geyser shut-off valve assembly is used. This alternative embodiment would also be used when a PVC T-shaped coupling member is used that does not have any internal threads in its top tubular sleeve. In this example a riser is connected to the coupling by using pipe dope. The alternative embodiment has a plurality of spring fingers extending upwardly from the top end of the valve housing. The outer peripheral diameter of the spring fingers would be greater than the inside diameter of either a metal or plastic riser. The riser would be forced down over the spring fingers causing them to be compressed radially inwardly so that they can enter the bottom end of the riser. The biased outward force of the spring fingers against the inside wall surface of the riser is generally sufficient to maintain the connection between the two. An extra safety locking system utilizes a plurality of locking springs each having an elongated main body portion having a top end and a bottom end. The finger portion extends from the bottom end of the main body portion and is captured in a compartment formed on the inner surface of a tubular body portion of the valve housing. The finger portion has to be compressed against the main body portion of the spring a sufficient amount in order to insert and lock the structure in the compartments. The top end of the main body portion of the spring has an arm portion extending acutely downwardly therefrom that must be compressed inwardly during insertion into the interior of the riser. It would provide sufficient biased force against the internal surface of the riser to prevent removal therefrom. Three of these locking springs have been provided in the alternative embodiment and each has its own compartment for capturing the bottom ends of the locking springs.

DESCRIPTION OF THE PREFERRED EMBODIMENT

Figure 1:
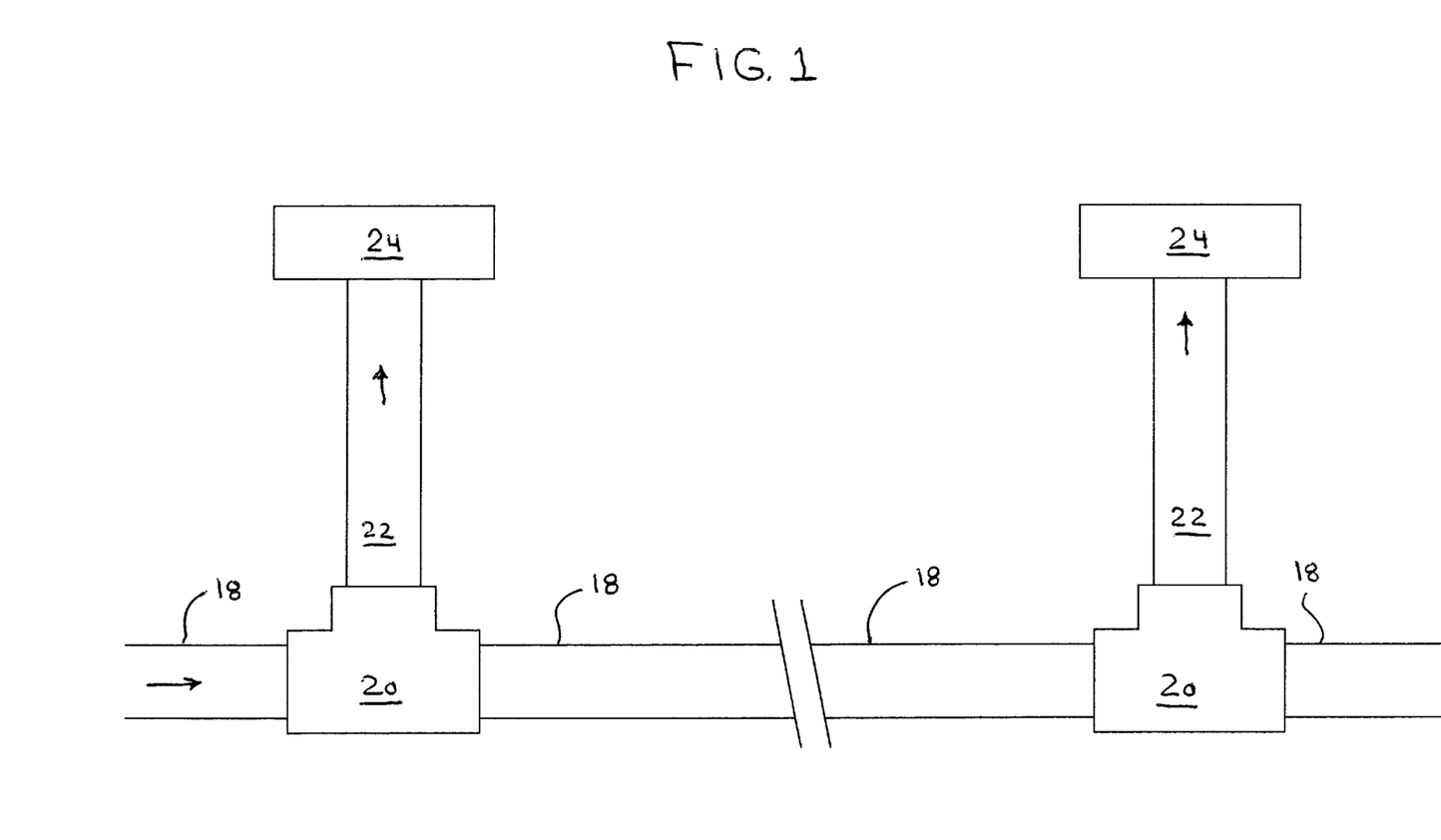
FIG. 1 is a schematic diagram of a portion of a water sprinkler irrigation system.

The anti-geyser shut-off valve assembly will now be described by referring to FIGS. 1–14 of the drawings. A schematic diagram of a portion of an irrigation system is illustrated in FIG. 1. It has a plurality of straight main line tubing members 18 that are connected to T-coupling members 20. A riser 22 is connected to the upwardly extending tubular sleeve of the respective T-coupling members and a sprinkler head 24 is connected to the top end of each of the risers.

Anti-geyser shut-off valve assembly 26 is best illustrated in FIGS. 1–8. It has a valve housing 28, an inverted conical wire spring 30, a valve member 32 and a push button nut 34. A Y-axis extends vertically down through the assembled parts.

Valve housing 28 has a tubular body portion 36 and a vertically oriented elongated shaft member 37. A plurality of rib members 38 connect the inner surface of tubular body portion 36 to the outer surface of shaft member 37 to form a unitary structure. Shaft member 37 has a head portion 39 having an upper bore hole portion 40. Shaft member 37 has a lower bore hole portion 42. A plurality of vertically oriented alignment grooves 43 are formed on the inner surface of tubular body portion 36. An annular flange 44 extends outwardly from tubular body portion 36 and its outer edge has threaded grooves 45 that mate with the internal threads of the T-coupling members 20.

Figure 2:
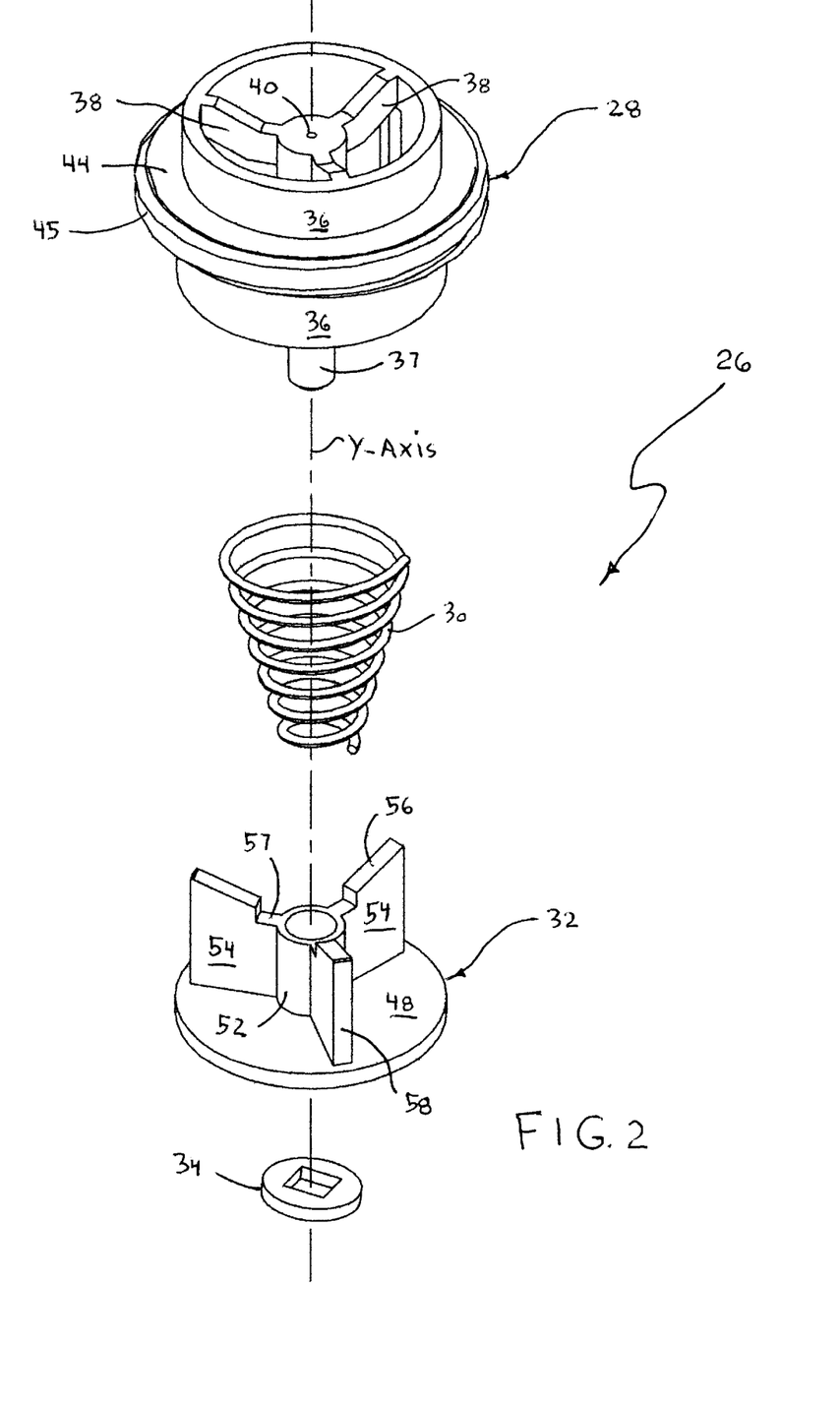
FIG. 2 is an exploded front perspective view of the anti-geyser shut-off valve assembly.
Figure 3:
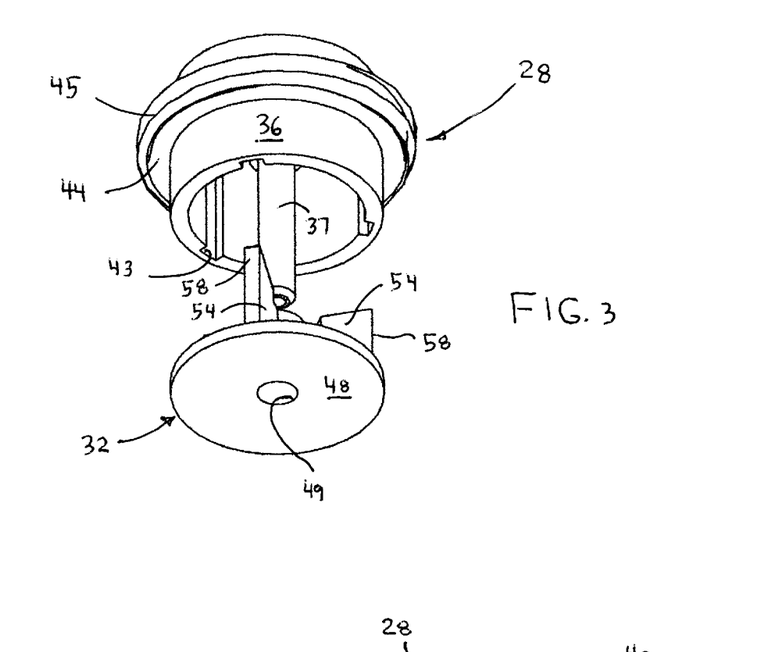
FIG. 3 is an exploded bottom perspective view of the anti-geyser shut-off valve assembly with the spring removed.
Figure 4:
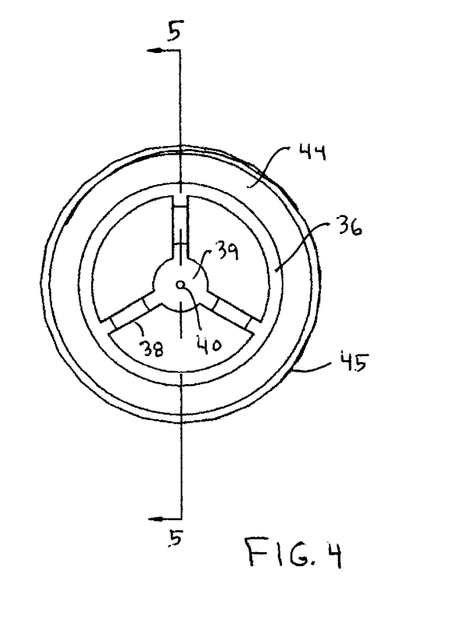
FIG. 4 is a top plan view of the valve housing.
Figure 5:
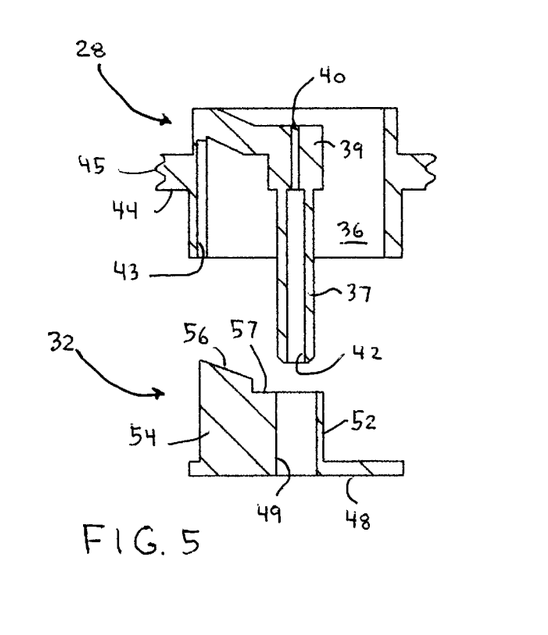
FIG. 5 is a cross sectional view taken along lines 5—5 of FIG. 4.
Figures 6, 7, 8:
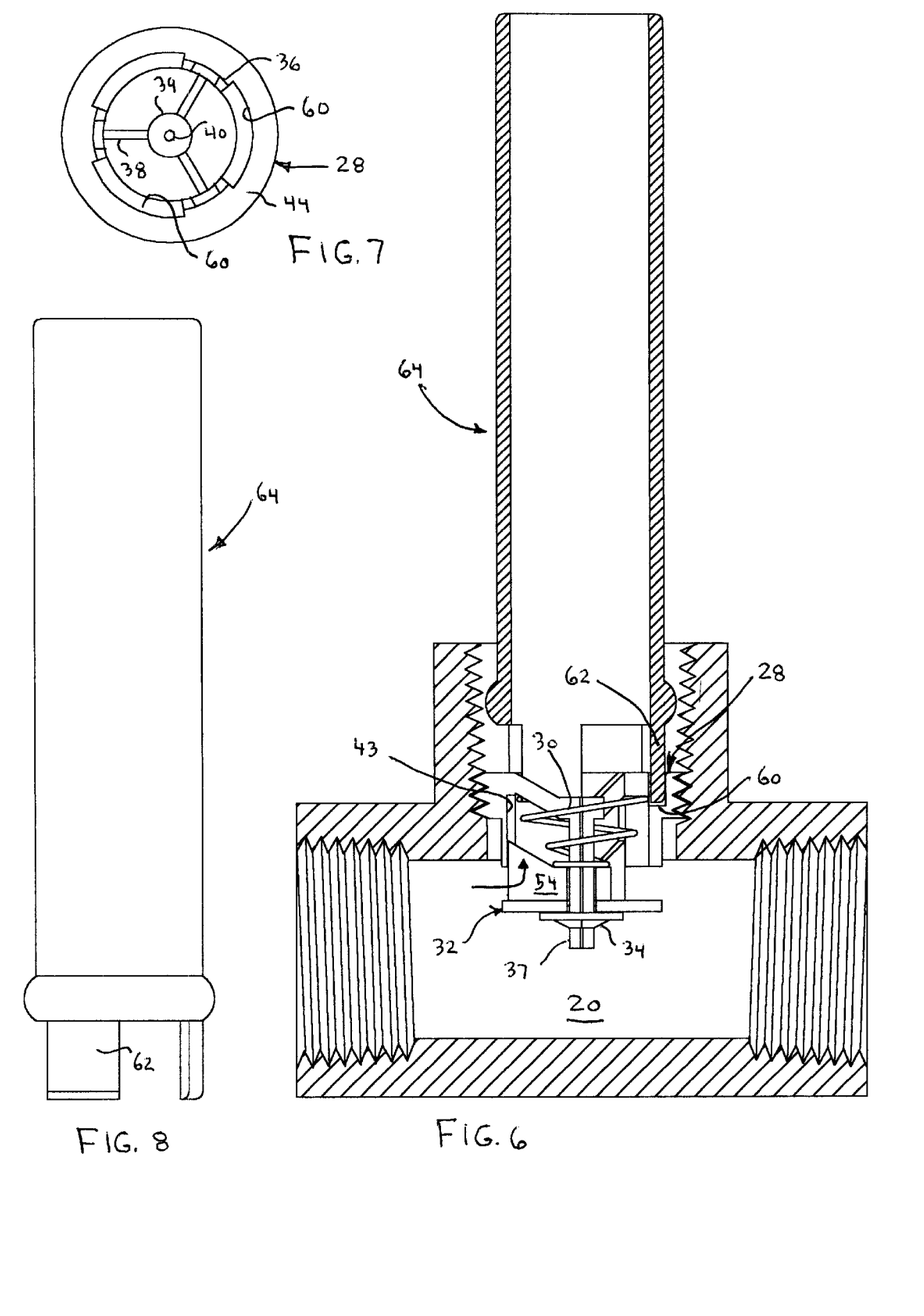
FIG. 6 is a vertical cross sectional view illustrating the anti-geyser shut-off valve assembly installed in a T-coupling member.
FIG. 7 is a top plan view of the valve housing.
FIG. 8 is a side elevation view of the installation and extraction tool.
Figure 9:
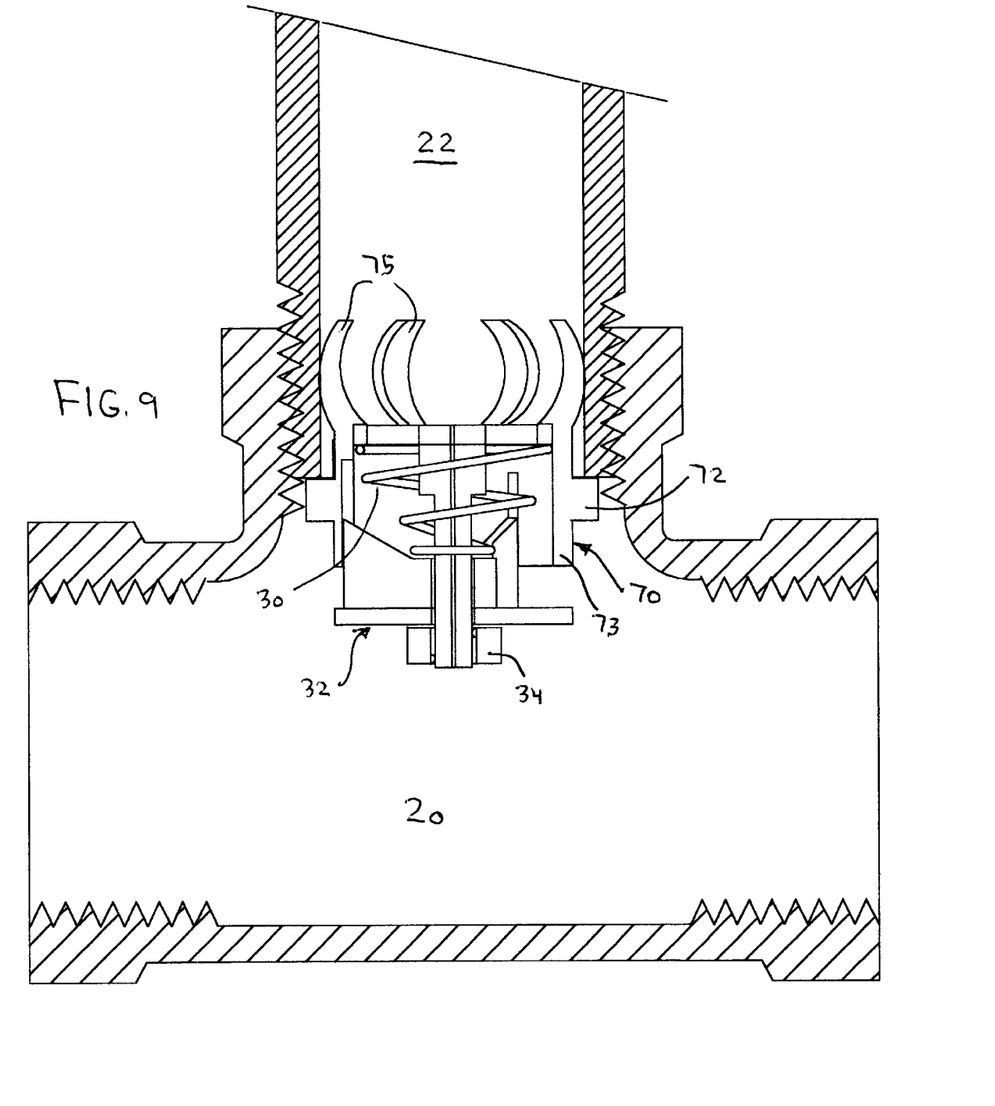
FIG. 9 is a vertical cross sectional view of a first alternative embodiment of the anti-geyser shut-off valve assembly.
Figure 10:
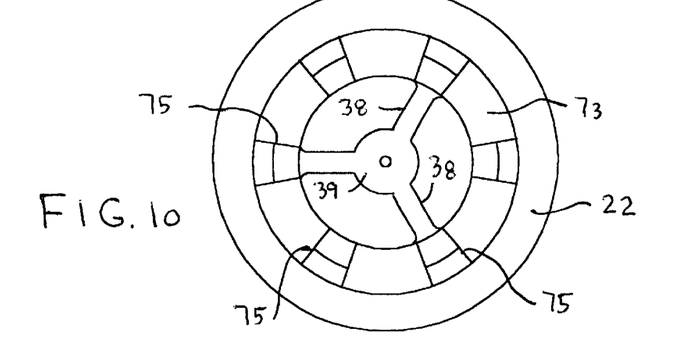
FIG. 10 is a top plan view of the first alternative embodiment valve housing.
Figure 11:
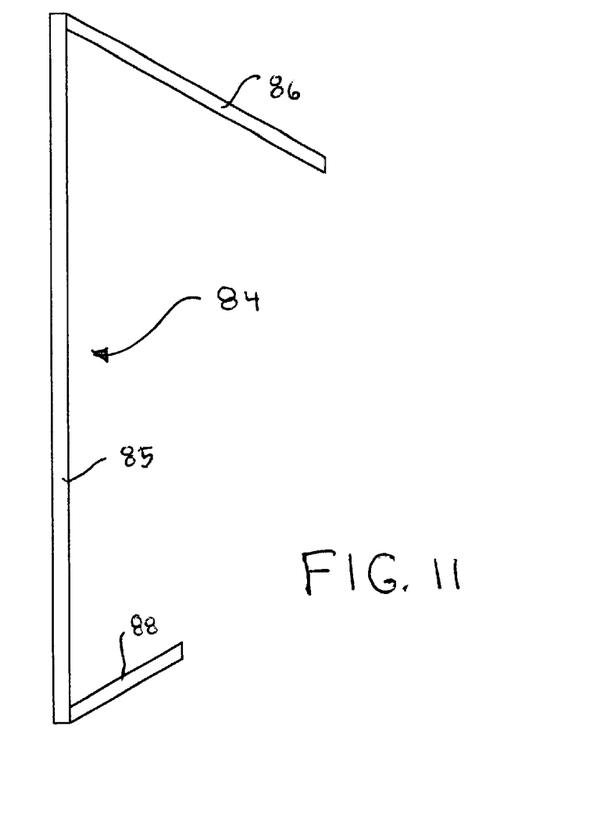
FIG. 11 is a side elevation view of the locking spring used with the first alternative embodiment.

The valve member 32 has a disc portion 48 having a bore hole 49 that aligns with the bore hole 51 of tubular sleeve 52. A plurality of brace members 54 have their bottom ends connected to disc portion 48 and their inner edges connected to tubular sleeve 52. Brace members 54 have a top edge 56 with a recessed support surface 57 for receiving the bottom end of a coiled wire spring 30. The outer edges 58 of the brace members are telescopically received in the alignment grooves 43 of valve housing 28. In FIG. 7, the top end of valve housing 28 is seen to have a plurality of sockets 60 for receiving the fingers' 62 of an installation and extraction tool 64.

Figure 12:
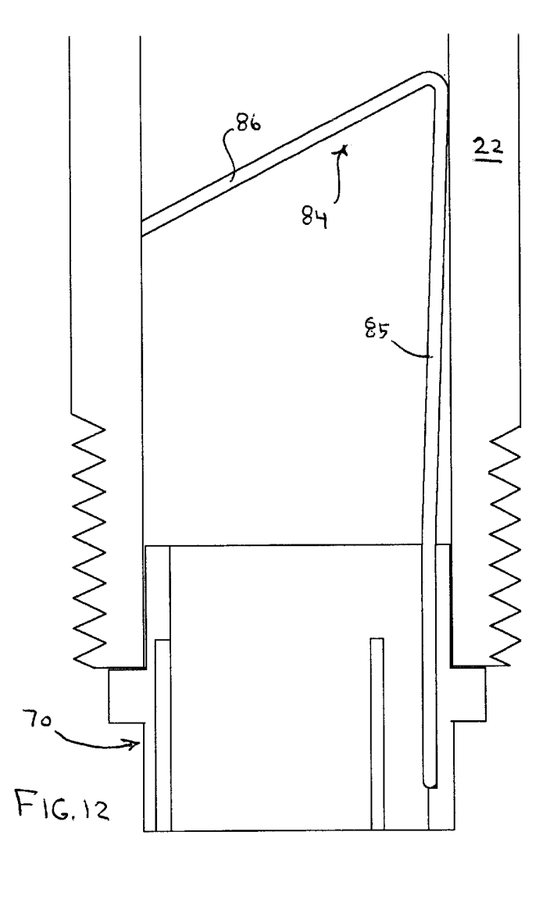
FIG. 12 is a schematic side elevation view illustrating the manner in which the locking spring functions.
Figure 13:
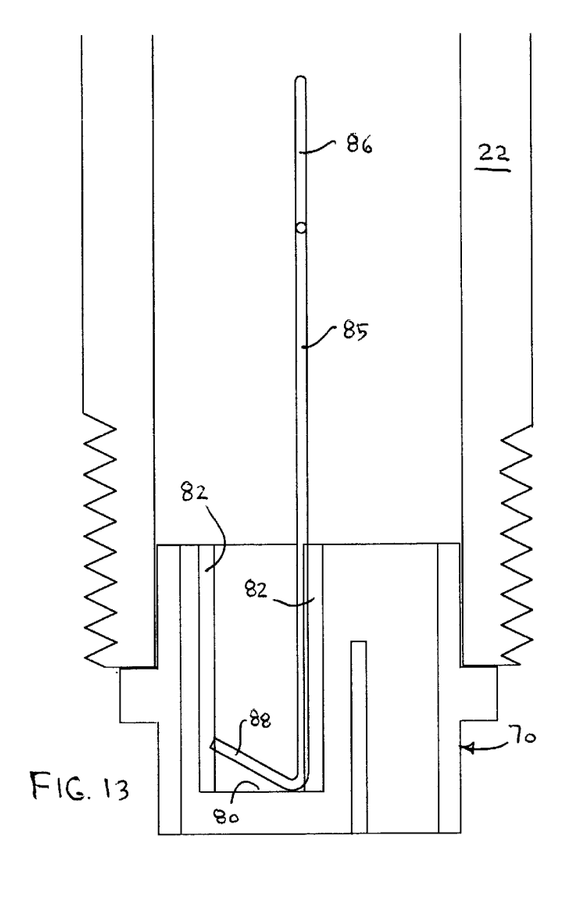
FIG. 13 is a schematic end view illustrating the manner in which the locking spring functions.
Figure 14:
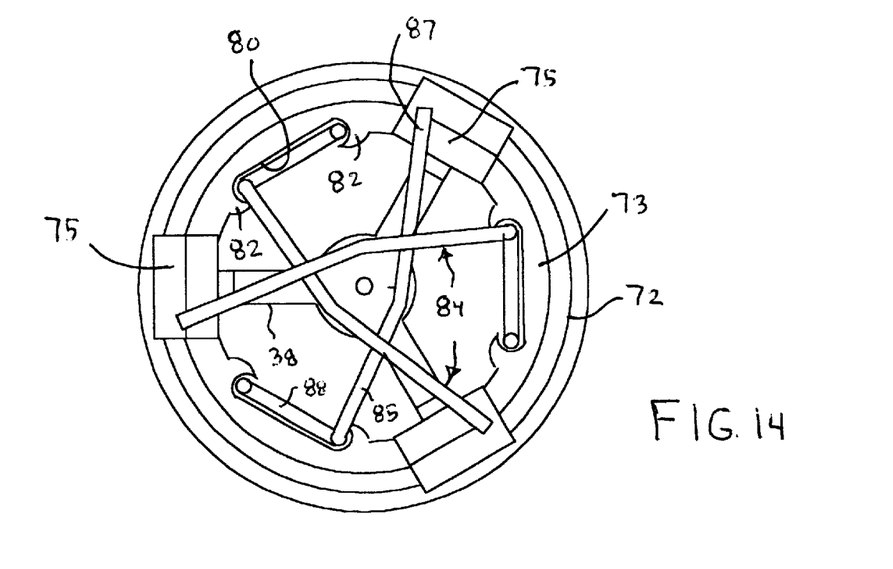
FIG. 14 is a top plan view illustrating the manner in which the locking springs would be captured in the top end of the valve housing.

An alternative embodiment of the anti-geyser shut-off valve assembly is illustrated in FIGS. 9–14. It has been designed to be used with metal T-shaped pipe coupling members whose internally threaded top tubular sleeve has a constant diameter. The alternative embodiment could also use PVCT T-shaped coupling members that do not have internal threaded sleeves and would use pipe dope to connect a riser thereto. The valve member 32 would be substantially identical to that described previously. Valve housing 70 would not have external threads on its annular flange 72 on tubular body portion 73. A plurality of arcuate springy fingers 75 would also extend upwardly from the top end of tubular body portion 73. These would compress slightly when inserted into either a metal or plastic riser. The force that they would exert on the respective inner surface of the risers would normally be sufficient to prevent their disengagement with the risers. As an added safety factor, the inner surface of the tubular body portion is provided with a plurality of compartments 80 with wedging members 82 on their opposite sides. A locking spring 84 would be utilized to insure that the riser would not become disconnected from the valve housing. Spring 84 has a main body portion 85 and an arm portion 86 extends downwardly at an acute angle from its top end. A finger portion 88 extends upwardly at an acute angle from its bottom end. The respective finger portions 88 of the locking springs 84 are shown captured in compartments 80 in FIG. 14. FIGS. 12 and 13 also show the manner in which the finger portions 88 are captured and also the manner in which the arm portions 86 are wedged between the inner wall surfaces of the riser members.

What is claimed is:

1. An anti-geyser shut-off valve assembly for a water sprinkler irrigation system comprising:

a valve housing having a tubular body portion having a vertically extending Y-axis, a top end, a bottom end, an outer surface and an inner surface; a vertically oriented elongated shaft member having a Y-axis, a top end, a bottom end, an outer surface and a bore hole extending from said top end to said bottom end; fixed support means connecting said inner surface of said tubular body portion to said outer surface of said shaft member to form a unitary structure;

a valve member having a vertically oriented tubular sleeve having a Y-axis, a top end, a bottom end, an outer surface and a vertical bore hole having an inner surface; a disc portion having a top surface, an outer edge, a bottom surface, a bore hole having a Y-axis and said top surface of said disc portion is connected to said bottom end of said tubular sleeve;

said shaft member of said valve housing being telescopically received in said bore hole of said tubular sleeve of said valve member;

spring means biasing said valve member away from said valve housing; and means for restricting the distance that said valve member may be biased away from said valve housing.

2. An anti-geyser shut-off valve assembly as recited in claim 1 wherein said means for restricting the distance that said valve member may be biased away from said valve housing is a push nut that is pressed onto the bottom end of said shaft member of said valve housing; said push nut having a top surface against which said bottom surface of said disc portion of said valve member would be downwardly biased.

3. An anti-geyser shut-off valve assembly as recited in claim 1 wherein said spring means is a coil spring having a top end and a bottom end and a plurality of helical loops that surround said shaft member of said valve housing in a spaced relationship.

4. An anti-geyser shut-off valve assembly as recited in claim 3 wherein said top end of said coil spring presses against said fixed support means that connects said inner surface of said tubular body portion of said valve housing to said outer surface of said shaft member of said valve housing.

5. An anti-geyser shut-off valve assembly as recited in claim 3 wherein said helical loop of said top end of said coil spring has a larger diameter than said helical loop of said bottom end to give said coil spring an inverted conical configuration.

6. An anti-geyser shut-off valve assembly as recited in claim 3 wherein said coil spring is made of metal material.

7. An anti-geyser shut-off valve assembly as recited in claim 1 wherein said outer surface of said tubular body portion of said valve housing has a helically threaded surface so that said valve housing can be threaded into the internally threaded upstanding tubular sleeve of an inverted T-shaped coupling member.

8. An anti-geyser shut-off valve assembly as recited in claim 1 wherein said fixed support means comprises a plurality of rib members.

9. An anti-geyser shut-off valve assembly as recited in claim 1 further comprising a plurality of brace members extending upwardly from said top surface of said valve member; said brace members having an inner edge connected to said tubular sleeve; said brace members having a bottom edge connected to said top surface of said disc portion of said valve member; said brace members also having an outer edge and a top edge.

10. An anti-geyser shut-off valve assembly as recited in claim 9 wherein said inner surface of said tubular portion of said valve housing has a plurality of vertically oriented alignment grooves that receive said outer edges of said respective brace members to provide reciprocal tracking means for the upward and downward travel of said valve member.

11. An anti-geyser shut-off valve assembly as recited in claim 1 in combination with a PVC T-shaped pipe coupling member with internally threaded sleeves.

12. An anti-geyser shut-off valve assembly as recited in claim 1 further comprising attachment means connected to said top end of said tubular body portion of said valve housing for gripping the interior wall of a tubular member that would be connected to said top end of said valve housing.

13. An anti-geyser shut-off valve assembly as recited in claim 12 wherein said attachment means comprises a plurality of spring fingers.

14. An anti-geyser shut-off valve assembly as recited in claim 12 further comprising locking means for securing said attachment means in the interior of a tubular member that would be connected to said top end of said valve housing.

15. An anti-geyser shut-off valve assembly as recited in claim 14 wherein said locking means comprises a plurality of locking springs each having a top end and a bottom end; compartments for capturing said bottom ends of said locking springs are formed on said inner surface of said tubular portion of said valve housing.

16. An anti-geyser shut-off valve assembly as recited in claim 15 wherein said compartments are each formed by a pair of laterally spaced wedging members that extend inwardly from said inner surface of said tubular body portion of said valve housing.

17. An anti-geyser shut-off valve assembly as recited in claim 1 further comprising a plurality of extraction tool sockets formed in said top end of said tubular body portion of said valve housing.

18. An anti-geyser shut-off valve assembly as recited in claim 12 in combination with a metal T-shaped pipe coupling member having internally threaded sleeves.

19. An anti-geyser shut-off valve assembly as recited in claim 12 in combination with a PVC T-shaped pipe coupling member whose inner surfaces are smooth and lacking internal threads.

* * * * *